United States Patent
Filatov et al.

(10) Patent No.: US 10,216,947 B2
(45) Date of Patent: *Feb. 26, 2019

(54) SYSTEM AND METHOD FOR ACTIVATING A DATA ENTRY MECHANISM

(71) Applicant: AO Kaspersky Lab, Moscow (RU)

(72) Inventors: Konstantin M. Filatov, Moscow (RU); Alexey P. Komissarov, Moscow (RU); Victor V. Yablokov, Moscow (RU); Olga O. Inozemtseva, Dubna (RU)

(73) Assignee: AO Kaspersky Lab, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 15/938,433

(22) Filed: Mar. 28, 2018

(65) Prior Publication Data
US 2018/0218136 A1  Aug. 2, 2018

Related U.S. Application Data

(63) Continuation of application No. 14/678,097, filed on Apr. 3, 2015, now Pat. No. 9,965,602.

(30) Foreign Application Priority Data

Feb. 20, 2015 (RU) ............................... 2015105811

(51) Int. Cl.
*G06F 21/00* (2013.01)
*G06F 21/62* (2013.01)
(Continued)

(52) U.S. Cl.
CPC .............. *G06F 21/62* (2013.01); *G06F 21/31* (2013.01); *G06F 21/51* (2013.01); *G06F 21/57* (2013.01); *G06F 2221/031* (2013.01)

(58) Field of Classification Search
None
See application file for complete search history.

(56) References Cited

U.S. PATENT DOCUMENTS

| | | |
|---|---|---|
| 5,923,481 A | 7/1999 | Lee |
| 7,698,563 B2 | 4/2010 | Shin |

(Continued)

OTHER PUBLICATIONS

Govindan, Geetha et al. Real time Security Management using RFID, Biometric and Smart Messages. 2009 3rd International Conference on Anti-counterfeiting, Security, and Identification in Communication. https://ieeexplore.ieee.org/stamp/stamp.jsp?tp=&arnumber=5276898 (Year: 2009).*

(Continued)

*Primary Examiner* — Jeremiah L Avery
(74) *Attorney, Agent, or Firm* — Arent Fox LLP; Michael Fainberg

(57) ABSTRACT

Disclosed are systems and methods for activating a data entry mechanism. An example method comprises detecting, by a hardware processor, an activity state of the application during execution on a user device, determining, by the hardware processor, security requirements, associated with the activity state, wherein the security requirements comprise properties for a data entry mechanism, activating, by the hardware processor, a data entry mechanism for receiving user input for the program, wherein the data entry mechanism is governed according to the properties of the security requirements, receiving user input from the user device from the data entry mechanism and displaying, by the hardware processor, a modified version of the user input, according to the properties of the security requirement.

20 Claims, 5 Drawing Sheets

(51) Int. Cl.
*G06F 21/31* (2013.01)
*G06F 21/51* (2013.01)
*G06F 21/57* (2013.01)

(56) References Cited

U.S. PATENT DOCUMENTS

| | | | | |
|---|---|---|---|---|
| 8,495,700 | B2* | 7/2013 | Shahbazi | H04L 63/20 |
| | | | | 380/247 |
| 8,495,732 | B2 | 7/2013 | Guenthner | |
| 8,793,777 | B2* | 7/2014 | Colson | G06F 21/34 |
| | | | | 726/7 |
| 9,032,544 | B2* | 5/2015 | Shelton | G06F 21/6245 |
| | | | | 726/28 |
| 2005/0044395 | A1 | 2/2005 | Staring et al. | |
| 2006/0064600 | A1* | 3/2006 | Polichetti | G06F 21/31 |
| | | | | 713/183 |
| 2008/0244694 | A1* | 10/2008 | Neystadt | H04L 63/1425 |
| | | | | 726/1 |
| 2009/0038006 | A1 | 2/2009 | Traenkenschuh et al. | |
| 2014/0250511 | A1* | 9/2014 | Kendall | H04L 63/0815 |
| | | | | 726/6 |
| 2015/0007259 | A1* | 1/2015 | Peterson | G06F 21/54 |
| | | | | 726/1 |
| 2015/0150107 | A1* | 5/2015 | Piliouras | H04L 63/12 |
| | | | | 726/7 |
| 2015/0200967 | A1* | 7/2015 | Redlich | G06Q 10/10 |
| | | | | 726/1 |
| 2015/0237026 | A1* | 8/2015 | Kumar | H04L 63/08 |
| | | | | 726/28 |

OTHER PUBLICATIONS

Burns, Luanne; Daly, Timothy. FXplorer: Exploration of Computed Software Behavior a New Approach to Understanding and Verification. 2009 42nd Hawaii International Conference on System Sciences. https://ieeexplore.ieee.org/stamp/stamp.jsp?tp=&arnumber=4755407 (Year: 2009).*

Yang, Chyan; Tsai, Chien-Chao. Managing Secure Communications With Multilevel Security and Restricted Character Set Translation. IEEE Journal on Selected Areas in Communications. vol. 11, Issue: 5. Pub. Date: 1993. http://ieeexplore.ieee.org/stamp/stamp.jsp?tp=&arnumber=223876.

Schriber, Thomas J.; Brunner, Daniel T. Inside Discrete-Event Simulation Software: How It Works and Why It Matters. Proceedings of the Winter Simulation Conference, 2001. Pub. Date: 2001. http://ieeexplore.ieee.org/stamp/stamp.jsp?tp=&arnumber=977260.

* cited by examiner

SYSTEM AND METHOD FOR ACTIVATING A DATA ENTRY MECHANISM

CROSS-REFERENCE TO RELATED APPLICATIONS

This application is a continuation of application Ser. No. 14/678,097 filed on Apr. 3, 2015, which further claims benefit of priority under 35 U.S.C. 119(a)-(d) to a Russian Application No. 2015105811 filed on Feb. 20, 2015, which is incorporated by reference herein.

FIELD OF TECHNOLOGY

This disclosure generally relates to the field of data security, and, specifically, to systems and methods for activating a data entry mechanism.

BACKGROUND

With the recent advances of mobile technologies, the number of mobile applications that access services requiring entry of confidential data has grew significantly. The entry of confidential information typically takes place when users are paying for goods and services on e-commerce websites, when accessing services requiring the entry of registration data, and so on. Payment with the use of banking applications is also used on stationary personal computers (PCs). As a result of the development of this industry, malicious software has made an appearance, which steals the user's confidential data which is used to pay for goods and services, and also to register for services and resources on the Internet.

One of the ways of stealing authentication and authorization data entered by the user via a data entry device is the interception of the data by a malware. The theft may occur at various stages: at the moment of entering data and/or at the moment of processing of this data by components of the hardware and software of the device on which this data is entered. The known security solutions do not provide effective protection from different types of security attacks. Therefore, there is a need to improve a mechanism for data entry protection.

SUMMARY

Disclosed are systems and methods for activating data entry mechanism for software applications. One technical result is to improve the security of the data being entered on a device by using different data entry mechanisms based on security requirements.

In one aspect, an example method comprises: detecting, by a hardware processor, an activity state of the application during execution on a user device, determining, by the hardware processor, security requirements, associated with the activity state, wherein the security requirements comprise properties for a data entry mechanism, activating, by the hardware processor, a data entry mechanism for receiving user input for the program, wherein the data entry mechanism is governed according to the properties of the security requirements, receiving user input from the user device from the data entry mechanism and displaying, by the hardware processor, a modified version of the user input, according to the properties of the security requirement.

In another example aspect, the activity state includes activation of a user interface element of the application that allows data entry.

In another example aspect, the properties of the security requirement indicate a form of entered characters, comprising one or more of obfuscated characters and blank characters and wherein the variable order of characters in the data entry mechanism changes after successive character entries.

In another example aspect, the security requirements indicate properties of a data entry mechanism required for the program.

In another example aspect, the security requirements include one or more of static security requirements and dynamic security requirements.

In another example aspect, static security requirements are specified during creation of the program.

In another example aspect, dynamic security requirements and associated data entry mechanisms are specified by a third-party security application during execution of the program.

In another example aspect, dynamic security requirements are based on one or more of: a location of a user device on which the program is installed; a type of firmware of the user device; a type and version of the operating system of the user device; and processes running on the user device.

In another aspect, an example system for selecting data entry mechanism for a program comprises a user device, which is in a particular activity state during execution of an application; and a hardware processor configured to: detect the activity state of the application, determine security requirements, associated with the activity state, wherein the security requirements comprise properties for a data entry mechanism, activate a data entry mechanism for receiving user input for the program, wherein the data entry mechanism is governed according to the properties of the security requirements, receive user input from the user device from the data entry mechanism; and display, by the hardware processor, a modified version of the user input, according to the properties of the security requirement.

In another aspect, an example non-transitory computer readable medium storing instructions thereon, that when executed perform a method for selecting a data entry mechanism for an application, the method comprising detecting, by a hardware processor, an activity state of the application during execution on a user device, determining, by the hardware processor, security requirements, associated with the activity state, wherein the security requirements comprise properties for a data entry mechanism, activating, by the hardware processor, a data entry mechanism for receiving user input for the program, wherein the data entry mechanism is governed according to the properties of the security requirements, receiving user input from the user device from the data entry mechanism and displaying, by the hardware processor, a modified version of the user input, according to the properties of the security requirement.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for selecting secure data entry mechanism for software applications. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 5:
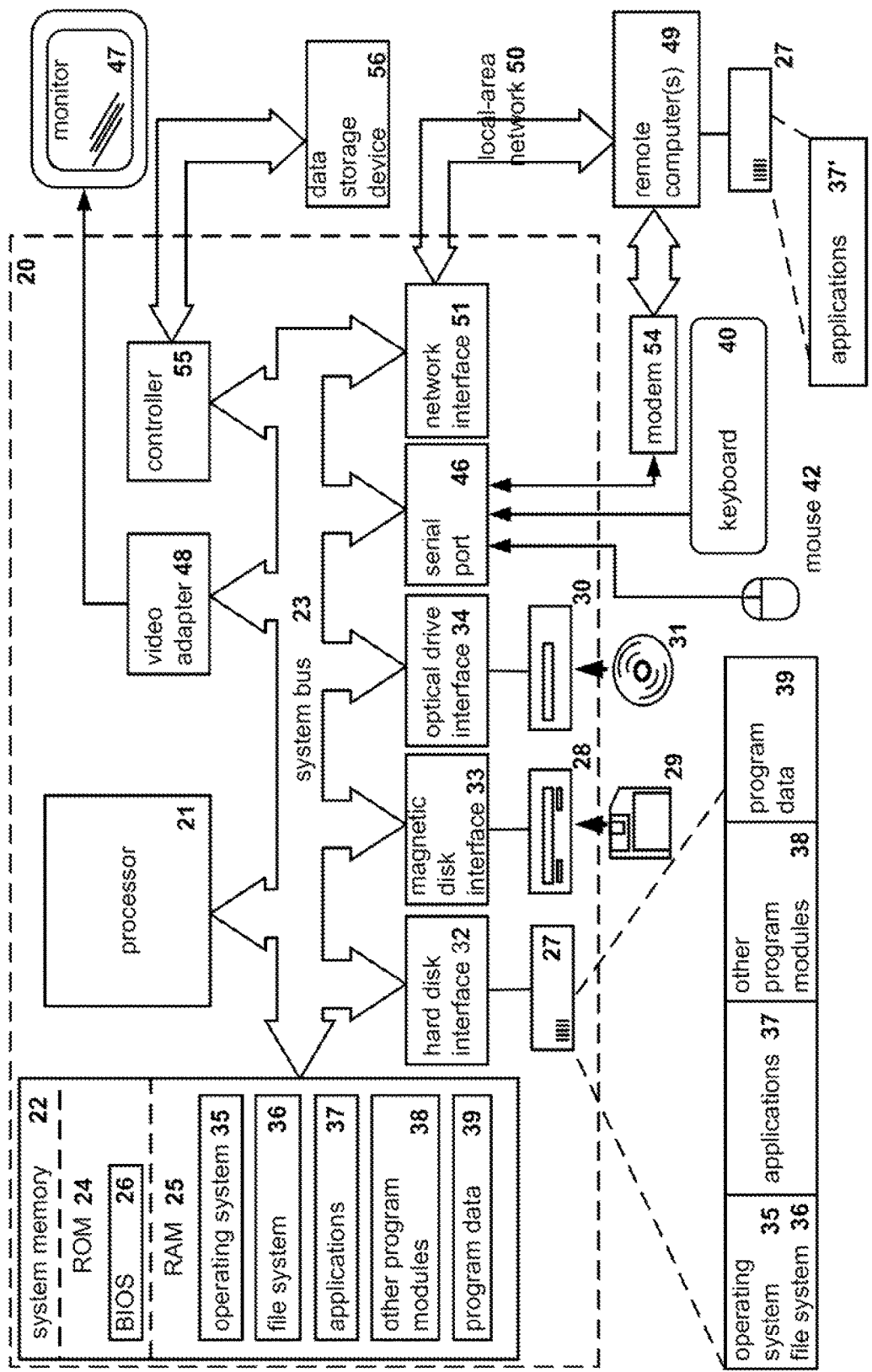
FIG. 5 illustrates an example of a general-purpose computer that may be used to implement systems and methods disclosed herein.

FIG. 5 shows an example of a general-purpose computer system (which may be a personal computer or a mobile device) 20, which may be used to implement a user device on which the systems, methods and computer program products for selecting secure data entry mechanism for software applications may be implemented. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The computer system 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer system 20 has a file system 36, where the recorded operating system 35 is kept, and also additional program applications 37, other program modules 38 and program data 39. The user is able to enter commands and information into the computer system 20 by using data input devices (keyboard 40, mouse 42, touchscreen). Other data input devices (not shown) can be used: microphone, joystick, game controller, scanner, and so on. Such data input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on. In one example aspect, the monitor 47 may have a touch screen interface, such as one shown in FIG. 1.

The computer system 20 is able to work in a network environment, using a network connection to one or more remote computers 49. The remote computer 49 are also personal computers or servers having the majority or all of the aforementioned elements in describing the nature of a computer system 20, as shown in FIG. 5. Other devices can also be present in the computer network, such as routers, network stations, peer devices or other network nodes.

Network connections can form a local-area computer network (LAN) 50, which can be a wired and/or wireless network, and a wide-area computer network (WAN). Such networks are used in corporate computer networks and internal company networks, and they generally have access to the Internet. In LAN or WAN networks, the computer system 20 is connected to the local-area network 50 across a network adapter or network interface 51. When networks are used, the computer system 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth or the like.

In various example aspects, the systems, methods and computer program products enable selection of a secure data entry mechanism for software applications 37 on the computer system 20. According to one aspect, the first step for selection of a data entry mechanism involves determination of the activity of the application 37 associated with the entry of data by a user. The term activity, as used herein, refers to the states of the application in which the application has at least one running process. Several states of activity are distinguished in relation to the interaction of the user with the application. For example, the state in which the user is interacting with the application, the application is visible to the user, and the window of the given application is placed in the foreground, is referred to as working in an active window ("foreground"). Such an activity may be determined in various ways, for example, by monitoring the messages (events) in the system, which tell the application that its window is now in the foreground (obtaining an event WM_ACTIVATE, for Windows, android.intent.action-.USER_FOREGROUND for Android OS) or messages which tell the application that the user is now interacting with one of the elements of the interface of said application (for example, the user has placed the cursor in the data entry field). It is also possible to determine such activity by polling the states of the running processes in the Activity Manager; the process having the state "Foreground activity" is the active process in the foreground, i.e., the application to which the now active process belongs, being visible to the user, and the window of the application is in the foreground.

In various aspects, other states of application activity may be distinguished. The state in which the activity of the application is visible to the user, but the window of the application is not in the foreground, is known as "visible" activity. The state in which the activity of the application is not visible to the user is known as "background" activity. In one particular aspect, in the Android OS, these states may be determined by polling of the activity manager.

In another example aspect, having determined the activity of the application, the next step in the selection of data entry mechanism for the application 37 involves determining the security requirements placed on the data entry for the detected activity. These requirements govern which of the mechanisms will be used for the entry of data and will be described below in greater detail. The security requirements may be obtained from remote network resources, such as remote computers 49 and/or the local devices, such as data storage 27, 29 or 31 of computer system 20. In various example aspects, these security requirements may be static (i.e., rigidly defined in the application) or formulated dynamically. In one example aspect, dynamic security requirements and associated data entry mechanisms are specified by a third-party security application during execution of the application 37 on the user device 20.

Figure 1:
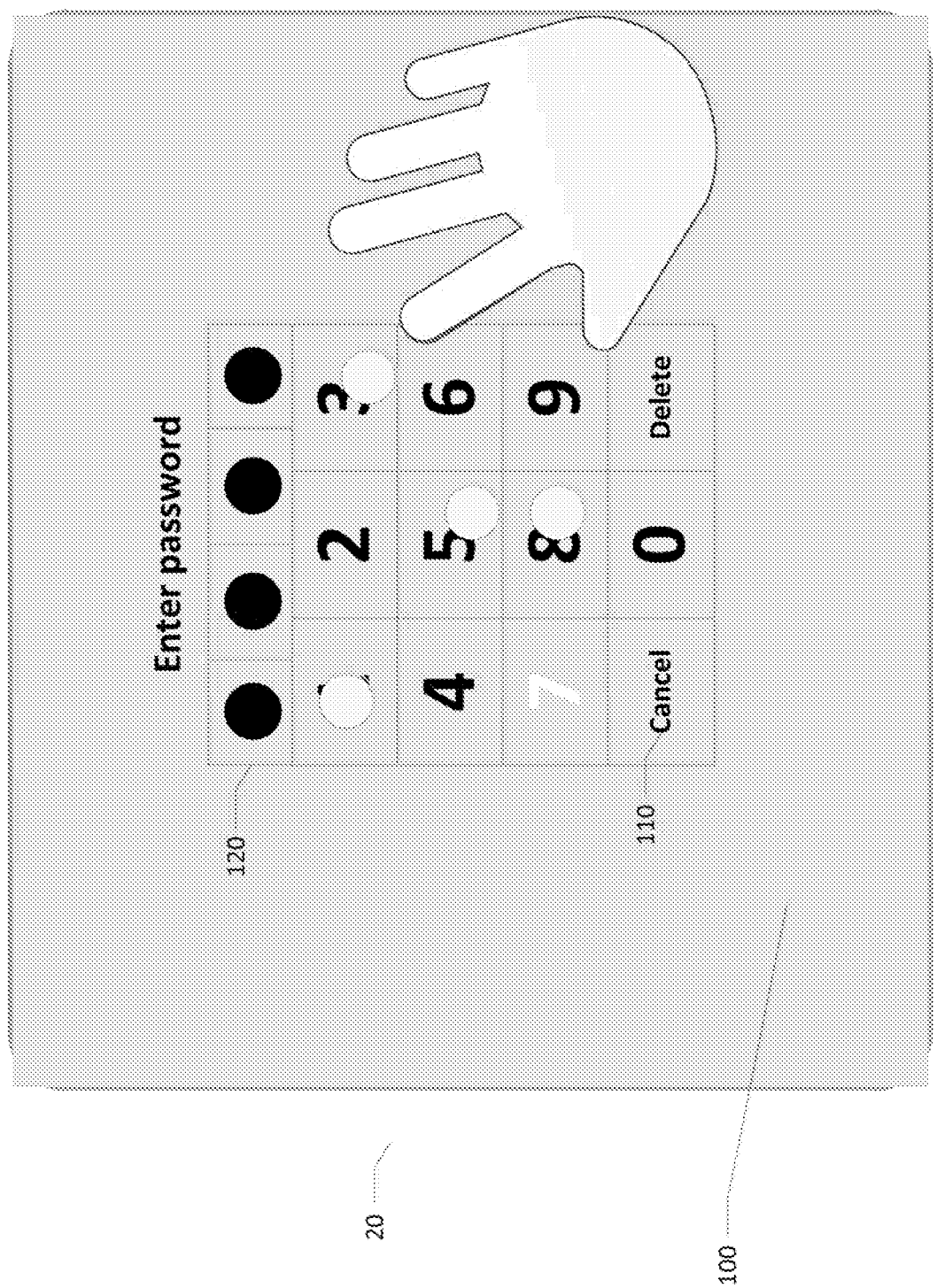
FIG. 1 shows an example embodiment of a virtual keyboard on a touch screen.
Figure 2:
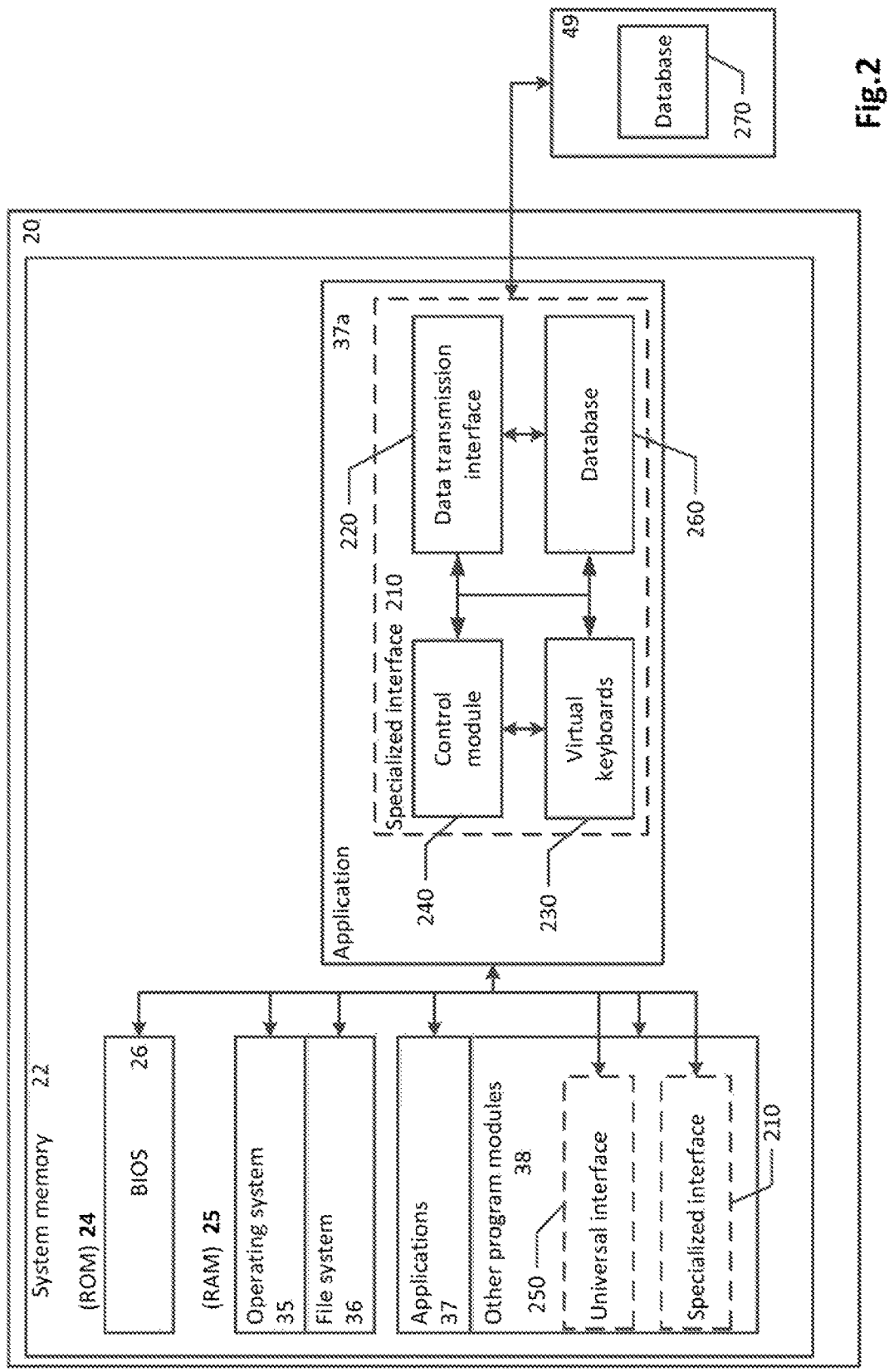
FIG. 2 shows an example of a protected application on a user device.

In one example aspect, the data entry methodology which is determined by the security requirements may include a set of software and hardware components of the user device, e.g., computer system 20 of FIGS. 1 and 2, and their respective properties which enable for the entry, processing, transmission and display of data, including but not limited to: data entry devices; data entry fields; the interface for transmission of data from the entry device to the entry field; the mechanism of storing the entered data on the device and the application; the mechanism of displaying the entered data in the entry field; the mechanism of checking of the integrity of the entered data; the mechanism of checking integrity of the application; the interface for transmission of the entered data to the application or to an external device, and also the data being entered.

Example software and hardware components associated with different data entry methodologies are illustrated in FIGS. 1, 2 and 5. The entry devices may include keyboards 40, coordinate entry devices 42 (mouse, track balls, touch pads) shown in FIG. 5, scanners, touch screens 100 shown in FIG. 1 and so on. The data entry device, such as a touch screen 100, is designed for entry of information into a mobile device, e.g., computer 20, and also for control of the mobile device via a graphic interface. The entry of data by a touch screen is done with the help of a virtual keyboard 110, a sample embodiment of which is shown in FIG. 1. There can be different embodiments of the virtual keyboard. As the virtual keyboard, one can use the standard virtual keyboard which comes with the operating system of the device by default, in one particular example by the universal interface 250 (FIG. 2). In another example, the keyboard may be different from the standard keyboard and have additional capabilities, for example such as an expanded set of characters for entry, a variable order of characters, visual effects when entering the characters (or lack thereof). A variable order of characters means that in each successive depiction of the virtual keyboard the order of the characters will differ from the order of the characters in the previous depiction. The entry of data on the virtual keyboard may be accompanied by visual effects, which indicate the pressing of a particular key. In one example aspect, these effects may be omitted. The variable order can be random or guaranteed (predictable). Specialized embodiments of virtual keyboards 230 in one particular example may be provided by a specialized interface 210 (FIG. 2).

In one example aspect, the interface for transmission of data to the application, in particular to the data entry field 120, from the data entry device, or to an external device, may include a collection of ready-made classes, procedures, functions, structures and constants, which are provided to the application 37a (FIG. 2) for the data transmission. This interface in one example is provided by the operating system under whose control the data entry device is working, and in which environment the application runs, utilizing said interface. When creating applications using only the interface provided by the operating system, a universal SDKs (software development kits) may be used. For example, the Android SDK, where the SDK is a set of devices allowing programmers to create applications for a particular program package, a software for basic development resources, a hardware platform, a computer system, game consoles, operating systems, and other platforms. In another example aspect, the interface further provides a specialized SDK. It should be noted that the application can use the interface of the universal SDK and specialized SDKs either exclusively or jointly. The interface provided by a specialized package generally is not supported by the operating system by default, and therefore it is installed on the device in addition, or it is part of the applications making use of it, as shown in FIG. 2 at item 210. In one example, the specialized interface may be created by inheriting the classes of the universal interface. The data transmission interface 220, in one example aspect, may be provided by the specialized interface 210.

In one example aspect, the method of storing the data entered may include a set of characteristics which specify whether data is stored in open or encrypted form on the device or in the application, the encoding in which the data is stored, the strength of the encryption key, the method of compressing the data, the data storage location (e.g., local database 260 or remote database 270).

In one example aspect, the method of displaying of the entered data characterizes how the data entered will be represented to the user. The entered data may be displayed as it is entered, it can be displayed in random order (first the third letter or word, then the first letter or word, and so on, until the entire word or sentence is produced), it might not be displayed at all, or in the form of characters different from the entered data, for example, in the form "*".

In one example aspect, the security requirements, as mentioned above, determine which data entry methodology is used. In one example, the security requirements indicate the means and the properties of these means which are to be used during the entry (for example, the means is a virtual keyboard entry device, and its properties are a variable order of characters and absence of visual effects). As mentioned, the security requirements can be static and specified at the stage of creation of the application (and be stored in the application); there can be several of them, or only one. In the case when the security requirement is static and single to the application, the data entry mechanism for the application may be constant (unchanging). For example, the security requirement establishes the use of a virtual keyboard with variable order of characters and absence of visual effects, no special requirements are placed on any of the other means of the entry methods, and consequently the universal means of the operating system will be used. The static security requirements which are specified in the stage of creation of the application depend on many criteria, such as the purpose of the application (such as banking), the operating system under which the application is created, the laws in the area of information security, and other factors whose significance has an influence on the formulation of the security requirements. The above specified security requirements were specific in nature, i.e., they directly indicated the mechanism for entry of data. Security requirements can have a general nature in one particular instance, for example, requirements not to display the characters entered by the user on the screen of the device. In this case, the application has some freedom in the choice of the mechanism which are able to fulfill the given requirement: in one example, the characters entered will be replaced on the screen with the character "*", in another example, no characters at all will be displayed on the screen. The security requirements may arrive at the device along with the application update, for example, if a new vulnerability appears in the operating system, such as the ability of an arbitrary application to obtain the coordinates of pressure points on the display of the device. In this case, the update of the security requirements for the data entry mechanism will arrive at the device or the specific application. The requirement will contain an indication of the mandatory use during data entry of a specialized virtual keyboard with variable order of characters, which ensures that even if malware or hacker obtains the coordinates of pressure points on the screen, it will not be possible to determine which character on the virtual keyboard was pressed, since different characters are displayed to the user at the very same coordinate each time the keyboard is used. In additional, input method may include verification of the application code or the entire application integrity, i.e., to check whether the illegitimate change in the application code is not authorized by the developer. Accordingly, the use of integrity check may be contained in the security requirements.

In one example aspect, the security requirement for the application is specified once (for example, at the stage of compiling of the next application version) and the data entry mechanism will remain unchanged, corresponding to the security requirement, for the entire time of existence of the current version of the application.

In another example aspect, dynamic security requirements may be used, which change depending on a number of criteria. Such criteria are at least the location of the user device 20, the firmware version of the device, the type of operating system and its version, the processes running on the device, the recipient of the entered data (e.g., a network resource), the applications installed on the device, and information about criteria characterizing surrounding of the device, which takes place in a current time, including such criteria as location of the device, version of the firmware, running processes, type and version of the operating system, etc. In one example aspect, prior to entering the data information on the above-indicated criteria may be collected and, on the basis of the information, a security requirement is formulated for the data entry mechanism. The security requirements are formulated, for example, with the help of a database, which establishes associations between the criteria and the security requirements. An example is shown below:

| Requirements | | Criteria Firmware | |
|---|---|---|---|
| | | basic | special |
| Virtual keyboard | with constant order of characters | 1 | 0 |
| | with variable order of characters | 1 | 1 |

The example shows the requirements for the virtual keyboard depending on the firmware of the device. Basic firmware is a firmware installed on the device by the manufacturer; in this case, the device is intended for a maximum indeterminate group of users. Special firmware is a firmware which differs from the basic firmware and can be installed by the manufacturer and be intended for a narrow defined group of users. In one example, special firmware may be a modified basic firmware, or firmware not similar to the basic firmware, and installed on the device, but not recommended by the manufacturer. The value "0" in the box means that use is not permitted, "1" means that use is permitted. Dynamic security requirements are especially useful in the case of virus outbreaks. In such events, use of dynamic security requirements allow quick changes to the input mechanism that will protect user data, which is subject of the attack of a specific modification of the virus, triggering an epidemic.

There are different methods for obtaining the values of the criteria. In one case, a control module 240 (FIG. 2) can be used, on the device 20; the control module 240 may be provided by a specialized interface 210. For example, to determine the location of the device, the control module 240 obtains data from geolocation services and, depending on the coordinates, specifies the value of the location criterion: home or a public place.

Figure 3:
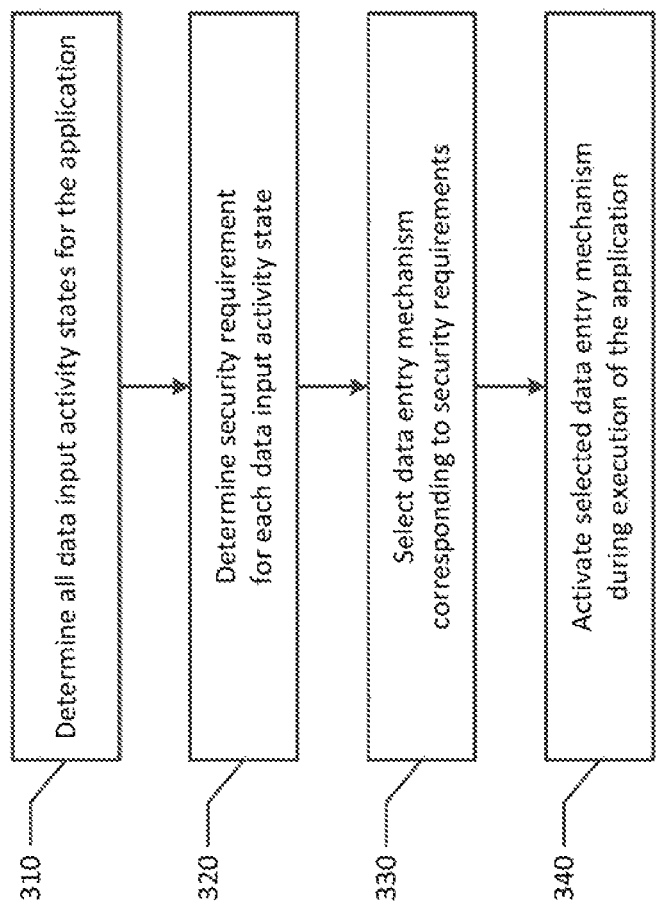
FIG. 3 shows an example method of statically selecting a secure data entry mechanism when creating an application.

FIG. 3 shows an example method of selecting a secure data entry mechanism when creating an application. In step 310, all data entry activity states of the application are determined. In one example aspect, it may be determined that the data entry mechanism does not depend on the activity of the application. In other words, for each of the states described above, data entry mechanism will be the same. Next, in step 320, the security requirements for all identified data entry activity states of the application are determined. At step 330, data entry mechanisms for each determined security requirements is selected. The selection of the data entry mechanism may include, but not limited to, selection of a data entry device, an interface for transmission of data from the data entry device, a method of storing the entered data, and a method of displaying the entered data. An application created in this way will use one predefined data entry mechanism for each data entry activity state; in the case, when the data entry mechanism does not depend on the activity state, the data entry mechanism will be constant for all instances of data entry in the application. Finally, in, step 340, the selected data entry mechanisms are activated during execution of the application on the user device.

Figure 4:
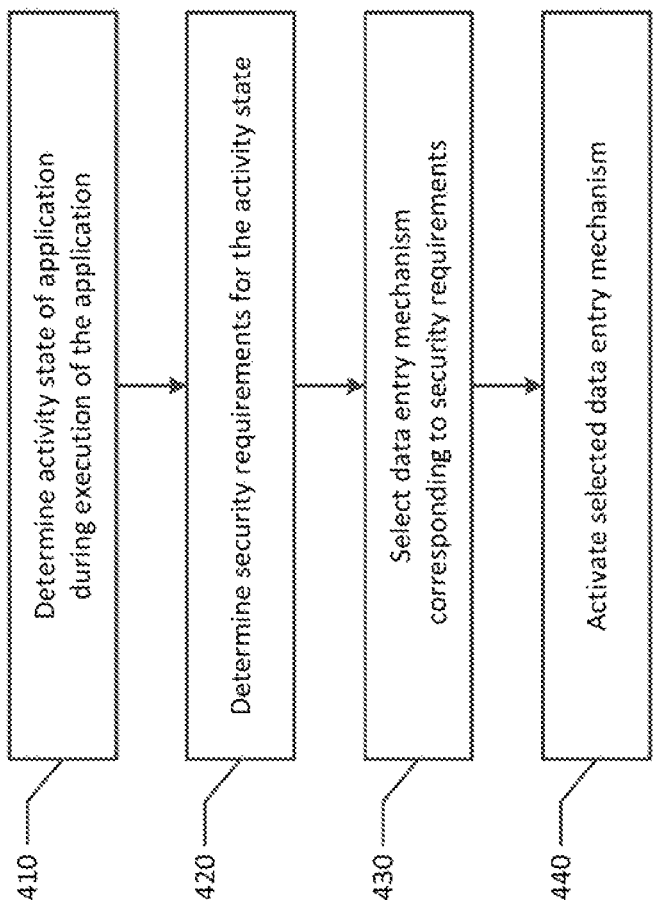
FIG. 4 shows an example method for dynamically selecting a secure data entry mechanism when executing an application.

In another example aspect, the application is created so the data entry mechanism is selected dynamically when the application is executed on the device, as illustrated in FIG. 4. In step 410, during execution of the application, the activity state of the application is determined, in one particular instance involving receipt of a request for data entry from a user. Having determined the activity state, in step 420, the security requirements for the activity state are determined. In one example, the entry requirements are determined not for all, but only for certain activity states, such as the state of Foreground activity (Android OS). As described above, the security requirements can be either static or dynamically formulated; the security requirements can be formulated and saved both on the device and remotely. After determining the security requirements for the detected data entry activity state, in step 430 the data entry mechanism corresponding to the obtained requirements is selected for the application. The selection of the data entry mechanism may include, but not limited to, selection of a data entry device, an interface for transmission of data from the data entry device, a method of storing the entered data, and a method of displaying the entered data.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for activating a data entry mechanism for an application, the method comprising:
   detecting, by a hardware processor, an activity state of the application during an execution of the application on a user device;
   determining, by the hardware processor, security requirements associated with the activity state, wherein the security requirements comprise properties for the data entry mechanism;
   activating, by the hardware processor, the data entry mechanism for receiving user input for the application, wherein the data entry mechanism is governed according to the properties of the security requirements;
   receiving user input from the user device in accordance with the data entry mechanism; and
   displaying, by the hardware processor, a modified version of the user input according to the properties of the security requirement.

2. The method of claim 1, wherein the activity state includes activation of a user interface element of the application that allows data entry.

3. The method of claim 1, wherein properties of the security requirement indicate a form of entered characters, the form of entered characters comprising one or more of obfuscated characters and blank characters and wherein a variable order of characters in the data entry mechanism changes after successive character entries.

4. The method of claim 1, wherein the security requirements indicate properties of a data entry mechanism required for the application.

5. The method of claim 1, wherein the security requirements include one or more of static security requirements and dynamic security requirements.

6. The method of claim 4, wherein static security requirements are specified during a creation of the application.

7. The method of claim 4, wherein dynamic security requirements and associated data entry mechanisms are specified by a third-party security application during the execution of the application.

8. The method of claim 7, wherein the dynamic security requirements are based on one or more of:
   a location of the user device on which the program is installed;
   a type of firmware of the user device;
   a type and version of an operating system of the user device; and
   processes running on the user device.

9. A system for activating a data entry mechanism for an application, the system comprising:
   a user device, which is in a particular activity state during an execution of an application; and a hardware processor configured to:
- detect the activity state of the application;
- determine security requirements associated with the activity state, wherein the security requirements comprise properties for the data entry mechanism;
- activate the data entry mechanism for receiving user input for the application, wherein the data entry mechanism is governed according to the properties of the security requirements;
- receive user input from the user device in accordance with the data entry mechanism; and
- display, by the hardware processor, a modified version of the user input according to the properties of the security requirement.

10. The system of claim 9, wherein the activity state includes activation of a user interface element of the application that allows data entry.

11. The system of claim 9, wherein properties of the security requirement indicate a form of entered characters, the form of entered characters comprising one or more of obfuscated characters and blank characters and wherein a variable order of characters in the data entry mechanism changes after successive character entries.

12. The system of claim 9, wherein the security requirements indicate properties of a data entry mechanism required for the application.

13. The system of claim 12, wherein static security requirements are specified during a creation of the application.

14. The system of claim 12, wherein dynamic security requirements and associated data entry mechanisms are specified by a third-party security application during the execution of the application.

15. The system of claim 14, wherein dynamic security requirements are based on one or more of:
- a location of the user device on which the program is installed;
- a type of firmware of the user device;
- a type and version of an operating system of the user device; and
- processes running on the user device.

16. The system of claim 9, wherein the security requirements include one or more of static security requirements and dynamic security requirements.

17. A non-transitory computer readable medium storing instructions thereon, that when executed perform a method for activating a data entry mechanism for an application, the method comprising:
- detecting, by a hardware processor, an activity state of the application during an execution of the application on a user device;
- determining, by the hardware processor, security requirements associated with the activity state, wherein the security requirements comprise properties for the data entry mechanism;
- activating, by the hardware processor, the data entry mechanism for receiving user input for the application, wherein the data entry mechanism is governed according to the properties of the security requirements;
- receiving user input from the user device in accordance with the data entry mechanism; and
- displaying, by the hardware processor, a modified version of the user input according to the properties of the security requirement.

18. The non-transitory computer readable medium of claim 17, wherein the activity state includes activation of a user interface element of the application that allows data entry.

19. The non-transitory computer readable medium of claim 17, wherein properties of the security requirement indicate a form of entered characters, the form of entered characters comprising one or more of obfuscated characters and blank characters and wherein a variable order of characters in the data entry mechanism changes after successive character entries.

20. The non-transitory computer readable medium of claim 17, wherein the security requirements indicate properties of a data entry mechanism required for the application.

* * * * *